United States Patent
Higuchi et al.

[11] Patent Number: 5,824,430
[45] Date of Patent: Oct. 20, 1998

[54] SEPARATOR FOR BATTERY

[75] Inventors: Hiroyuki Higuchi; Kiichiro Matsushita; Soji Nishiyama, all of Osaka, Japan

[73] Assignee: Nitto Denko Corporation, Osaka, Japan

[21] Appl. No.: 797,298

[22] Filed: Feb. 7, 1997

[30] Foreign Application Priority Data

Feb. 9, 1996 [JP] Japan .................................. 8-023810

[51] Int. Cl.$^6$ ..................................................... H01M 2/16
[52] U.S. Cl. ........................ 429/62; 429/144; 428/316.6
[58] Field of Search ................... 429/62, 144; 428/316.6

[56] References Cited

U.S. PATENT DOCUMENTS

| | | | |
|---|---|---|---|
| 3,801,404 | 4/1974 | Druin et al. | 156/229 |
| 4,650,730 | 3/1987 | Lundquist et al. | 429/62 |
| 5,281,491 | 1/1994 | Rein et al. | 429/62 |
| 5,480,745 | 1/1996 | Nishiyama et al. | 429/242 |
| 5,565,281 | 10/1996 | Yu et al. | 429/62 |

FOREIGN PATENT DOCUMENTS

| | | |
|---|---|---|
| 0547237 | 6/1993 | European Pat. Off. . |
| 0682376 | 11/1995 | European Pat. Off. . |
| 55-32531 | 8/1980 | Japan . |
| 62-10857 | 1/1987 | Japan . |
| 6-212006 | 8/1994 | Japan . |
| WO93/13565 | 7/1993 | WIPO . |

OTHER PUBLICATIONS

The Eleventh International Seminar on Primary and Secondary Battery Technology and Application, Feb. 28–Mar. 3, 1994, Ocean Resort Hotel and Conference Center, Deerfield Beach, Florida.

Seventh International Meeting on Lithium Batteries, Boston, Massachusetts USA May 15–20, 1994, Extended Abstracts and Program.

Patent Abstracts of Japan, Abstract of JP-A 5-013062 (22 Jan. 1993).

*Primary Examiner*—Stephen Kalafut
*Attorney, Agent, or Firm*—Sughrue, Mion, Zinn, Macpeak & Seas, PLLC

[57] ABSTRACT

A separator for battery which exhibits a low electrical resistivity at normal time, good SD characteristics and a high mechanical strength is disclosed. A high molecular weight polypropylene having a weight average molecular weight of 500,000 or more and a polyethylene having a melting point of from 100° to 140° C. are extruded through a T-die film-forming machine to prepare a laminate film comprising a laminate of the high molecular polypropylene layer and the polyethylene layer. The laminate film is stretched at a temperature as low as from −20° C. to 80° C. by 10% to 100% based on the length of the original film, stretched at a temperature as high as 80° C. to 130° C. by 60% to 300% based on the length of the unstretched film, and then shrunk at the same temperature by 5% to 30% based on the length of the stretched film to render the film porous. Thus, a porous laminate film having a Gurley value of from 200 to 1,500 is prepared as a separator for battery.

16 Claims, 2 Drawing Sheets

SEPARATOR FOR BATTERY

FIELD OF THE INVENTION

The present invention relates to a separator for battery for use in the separation of positive electrode and negative electrode in a battery.

BACKGROUND OF THE INVENTION

Separators for battery vary in their shape depending on the kind or other factors of the battery in which they are incorporated. For example, separators for battery made of porous film, non-porous film, nonwoven fabric, paper, etc. are known.

These separators for battery must meet some requirements, i.e., affinity for (wettability by) electrolyte, retention of liquid, low electrical resistance at normal time and high mechanical strength. The low electrical resistance at normal time corresponds to the ion permeability of separator for battery and thus can be regarded as an air permeability of separator for battery.

Of those characteristics, affinity for electrolyte, retention of liquid and low electrical resistance at normal time are related to the dischargeability of the battery and thus are required to facilitate the migration of ions during battery reaction. Further, mechanical strength is related to separator break and penetration occurring during and after battery assembly. The higher the mechanical strength of the separator is, the less can be the occurrence of inner shortcircuiting in the battery.

On the other hand, a small-sized light lithium battery having a high energy density has been noted as a battery applicable to the recent trend of cordless-electronic apparatus. This lithium battery comprises a lithium-containing metal oxide incorporated in the positive electrode, a material capable of occluding lithium ion, e.g., carbon, and metallic lithium incorporated in the negative electrode, and a mixture of organic solvents such as ethylene carbonate, propylene carbonate, diethyl carbonate and 1,2-dimethoxyethane as an electrolyte. This lithium battery is liable to excessively rise the battery temperature due to misuse such as external shortcircuiting or overcharge. Therefore, this lithium battery is provided with various safety devices such as safety valve, PTC (positive temperature coefficient) element (element which shows a resistance increase upon the passage of excessive electric current to stop the passage of electric current) and current controlling circuit. The separator to be incorporated in this lithium battery must also meet some requirements to secure safety. For example, shut-down (SD) function is indispensable for the separator for battery in addition to the above various requirements.

The SD function is to cause a sudden rise in the electrical resistance of the separator for battery upon the excessive rise in the inner temperature of the battery, suspending the battery reaction and hence inhibiting further temperature rise. The temperature at which the electrical resistance of the separator for battery begins to rise is called SD initiation temperature. For example, the mechanism of development of the SD function, if the separator for battery is made of a porous film, involves the elimination of the porosity of the film when the inner temperature of the battery reaches a predetermined value to render the film nonporous, whereby the penetration of ions therethrough can be shut down.

However, even if the porous film is thus rendered nonporous to shut down the penetration of ions, the desired electrical insulation of the separator cannot be maintained when the inner temperature of the battery further rises to an extent that the entire film is melted and broken. Therefore, the temperature at which the film can no longer retain its original shape and thus can no longer shut down the penetration of ions therethrough is referred to as "heat resistant temperature". The higher this heat resistant temperature is, the higher is the heat resistance of the separator for battery. Further, the greater the difference between the heat resistant temperature and SD initiation temperature is, the higher is the safety of the battery.

As the separator to be incorporated in such a lithium battery there has been known a separator made of a porous film obtained by, e.g., melt molding polypropylene (PP) at a high draw ratio to form a film which is then subjected to heat treatment followed by drawing (as disclosed in JP-B-55-32531 (The term "JP-B" as used herein means an "examined Japanese patent publication"), U.S. Pat. No. 3,801,404, etc.). The porous film has a high strength but is disadvantageous in that it is made of polypropylene alone and thus has a high SD initiation temperature.

Further, a separator for battery comprising a laminate of porous films each having a different melting temperature has been proposed as a separator for battery having improved SD characteristics (JP-A-62-10857 (The term "JP-A" as used herein means an "unexamined published Japanese patent application")). However, this separator for battery does not have a sufficient mechanical strength. Further, due to its laminate structure, this separator for battery has a large total thickness and thus cannot possibly meet the requirement for miniaturization of a battery.

Further, a separator for battery made of a microporous membrane (film) comprising an ultrahigh molecular weight polyethylene (PE) has been known having a maximum allowable penetrating load of 400 gf or more (JP-A-6-212006). However, the preparation of this separator for battery needs to involve a procedure for dissolving the polyethylene in an organic solvent to form an ultrahigh molecular weight polyethylene film or a procedure for extracting the solvent to render the resulting film porous. These procedures disadvantageously add to the production cost. Further, the use of an organic solvent causes troubles in environments, including working atmosphere.

Moreover, a separator for battery having an improved breakage resistance obtained by laminating a porous polypropylene film and a porous polyethylene film is disclosed in "The 11th International Seminar On Primary And Secondary Battery Technology And Application, 1994, Feb. 28th", Florida Educational Seminars, Inc. and "Seventh International Meeting On Lithium Batteries, May 15–20, 1994, Extended Abstracts And Program", pp. 72–76. However, this separator for battery has an excellent mechanical strength but is disadvantageous in that it has a maximum electrical resistivity after initiation of SD as low as 80 $\Omega.cm^2$.

SUMMARY OF THE INVENTION

Accordingly, an object of the present invention is to provide a separator for battery, having a low electrical resistance at normal time, a high mechanical strength and good SD characteristics.

The above object of the present invention can be accomplished with a separator for battery comprising a porous laminate film, wherein the porous laminate film comprises a porous high molecular weight polypropylene layer having a weight average molecular weight of 500,000 or more and a porous layer comprising a material having a melting point of from 100° to 140° C., and has a Gurley value at 25° C. of from 200 to 1,500.

The inventors made a series of studies of the structure, constituent materials, physical properties, etc., of separator for battery to overcome the above-described problems. As a result, it has been found that the formation of a porous high molecular weight polypropylene layer having a weight average molecular weight of 500,000 or more as a layer constituting the porous laminate film can provide a separator for battery having a sufficient mechanical strength as well as a high heat resistant temperature. It has also been found that the formation of a porous layer comprising a material having a melting point of from 100° C. to 140° C. as another layer constituting the porous laminate film can provide a separator for battery having a SD initiation temperature falling within an appropriate range as well as a sufficiently high electrical resistance during the development of SD function. It has further been found that when the Gurley value at 25° C. of the porous laminate film is from 200 to 1,500, the resulting separator for battery normally exhibits a low electrical resistance. The present invention has been completed based on those findings.

The term "Gurley value" as used herein means an indication of air permeability of paper or the like as specified in JIS P 8117. This is determined by multiplying the time required until 100 cc of air is passed through a film (or paper) per unit area of 645 mm$^2$ by ten.

In the present invention, the porous laminate film preferably has a needle penetration strength of 400 g or more, a shut-down initiation temperature of from 100° to 135° C., a heat resistant temperature of 155° C. or more and an electrical resistivity at 135° C. of 100 Ω.cm$^2$ or more.

The term "needle penetration strength" as used herein means the maximum allowable load under which the porous laminate film can withstand the penetration of a needle having a diameter of 1.0 mm and a tip with a radius of curvature of 0.5 mm through a holder having a diameter of 11.3 mm at an indentation rate of 2 mm/sec. by a compression tester.

The term "heat resistant temperature" as used herein means the temperature at which the electrical resistivity of the separator for battery which has once been raised drops to 10 Ω.cm$^2$ or lower.

For the reason that the separator for battery of the present invention advantageously comprises as a surface layer a high strength layer to prevent a membrane (separator for battery) from being damaged during assembly into battery, the porous laminate film preferably has a laminate structure comprising three or more layers and the surface layer of the porous laminate film comprises a porous high molecular weight polypropylene having a weight average molecular weight of 500,000 or more.

In the separator for battery of the present invention, the weight average molecular weight of the high molecular weight polypropylene is preferably 800,000 or more in order to obtain a membrane (separator for battery) having a high strength. The weight average molecular weight of the high molecular polypropylene is generally from 500,000 to 1,500,000 in the present invention. This is because the high molecular weight polypropylene tends to have difficulties in film formation when it has a molecular weight of greater than 1,500,000.

In the separator for battery of the present invention, the proportion of the total thickness of porous high molecular weight polypropylene layers having a weight average molecular weight of 500,000 to the entire thickness of the separator for battery preferably falls within the range of from 20% to 99% to assure both the strength and SD characteristics.

Similarly, in order to assure both the strength and SD characteristics, the porous layer comprising a material having a melting point of from 100° C. to 140° C. preferably comprises as a main component a resin composition comprising 0% to 60% by weight of a polypropylene and 40% to 100% by weight of a polyethylene, the sum of the polypropylene and the polyethylene being 100% by weight.

The higher the polyethylene proportion by weight is, the easier can be assured SD characteristics but slightly lower is the strength. Further, if the amount of the polyethylene is less than 40% by weight, there is a tendency for SD characteristics to be hardly assured.

The term "main component" as used herein means that the proportion of the above material in the entire porous layers is 80% by weight or more, preferably 90% by weight or more, and more preferably 95% by weight or more.

DETAILED DESCRIPTION OF THE INVENTION

Figure 1:
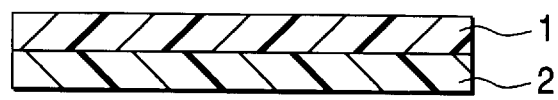
FIG. 1(a) is a sectional view illustrating an embodiment of the separator for battery according to the present invention.
FIG. 1(b) is a sectional view illustrating another embodiment of the separator for battery according to the present invention.
FIG. 1(c) is a sectional view illustrating a further embodiment of the separator for battery according to the present invention.
Figure 1:
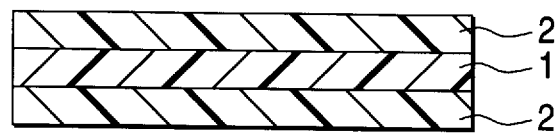
Figure 1:
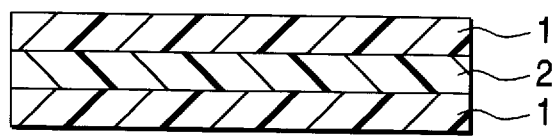

The separator for battery of the present invention will be further described hereinafter.

In the separator for battery of the present invention, the porous high molecular weight polypropylene layer having a weight average molecular weight of 500,000 or more is mainly adapted to assure the desired mechanical strength of the separator for battery and retain the desired shape (film-like) of the separator for battery even when the inner temperature of the battery rises. The thickness of the single porous layer is usually from 2 to 50 μm, and preferably from 5 to 30 μm.

Examples of the material constituting the porous layer comprising a material having a melting point of from 100° C. to 140° C. include high density polyethylene (PE), middle density polyethylene, low density polyethylene, and polybutene. Examples of the porous layer include porous layer comprising high density polyethylene alone, porous layer comprising low density polyethylene alone, porous layer comprising polybutene alone, and porous layer comprising a blend of polypropylene (PP) and high density polyethylene, low density polyethylene or polybutene. As previously described, the material constituting the porous layer comprising a material having a melting point of from 100° to 140° C. is preferably a resin composition comprising 0% to 60% by weight of a polypropylene and 40% to 100% by weight of a polyethylene, the sum of the polypropylene and the polyethylene being 100% by weight.

Other examples of the porous layer include a layer obtained by coating the surface of the porous high molecular weight polypropylne layer with a dispersion of powdered wax (melting point: 100° to 140° C.) or polyethylene in a liquid. In this structure, the wax or the like is attached to the surface of the porous high molecular weight polypropylene layer while being kept powdered. The resulting surface layer is porous.

The thickness of the single porous layers comprising a material having a melting point of from 100° to 140° C. is usually from 2 to 40 μm, and preferably from 5 to 30 μm.

The lamination of this porous layer on the porous high molecular weight polypropylene layer provides a separator for battery having SD initiation temperature of from 100° to 135° C. In other words, the separator for battery comprises a material having a melting point of from 100° to 140° C. When the inner temperature of the battery rises to this range of melting point, this material melts to destroy the porosity of the porous layer and hence render the film nonporous, allowing the development of SD characteristics. Accordingly, when the melting point of the material is below 100° C., the resulting SD function works too delicately for practical use. On the contrary, when the melting point of the material exceeds 140° C., it is made difficult to inhibit further exothermic reaction when the inner temperature of the battery shows an abnormal rise. The range of the melting point is preferably from 100° to 140° C., and more preferably from 110° to 130° C., taking into account the preferred SD initiation temperature.

The porous laminate film to be incorporated in the separator for battery of the present invention needs to exhibit a Gurley value at 25° C. of from 200 to 1,500. As previously described, Gurley value is one of indications of air permeability. The smaller this value is, the higher is the air permeability. Gurley value is closely related to an ion permeability of the separator inside the battery, i.e., the chargeability of the battery. Thus, the higher the air permeability is (the less Gurley value is), the better is the chargeability of the battery. However, if the air permeability of the separator for battery is too high (Gurley value is below 200), any possible misuse of the battery causes excessive reaction that can be hardly controlled. On the contrary, if the air permeability of the separator for battery is too low (Gurley value exceeds 1,500), the separator for battery finds difficulty in ion permeability. From the standpoint of balance between chargeability and safety of battery, the range of Gurley value is preferably from 200 to 1,500, and more preferably from 400 to 1,000.

The laminate structure of the separator for battery of the present invention is not specifically limited but is as shown in FIG. 1 by way of example. Examples of such a laminate structure include (1) a structure comprising a porous layer 2 comprising a material having a melting point of from 100° to 140° C. provided on one side of the porous high molecular weight polypropylene layer 1 (as shown in FIG. 1(a)), (2) a structure comprising a material having a melting point of from 100° to 140° C. provided on both sides of the porous high molecular weight polypropylene layer 1 (as shown in FIG. 1(b)), and (3) a structure comprising a porous high molecular weight polypropylene layer 1 provided on both sides of a porous layer 2 comprising a material having a melting point of from 100° to 140° C. (as shown in FIG. 1(c)). Preferred among these laminate structures is the laminate structure (3), which can provide the resulting separator with an increased mechanical strength. A laminate of the laminate structure (3) (6 layers, 9 layers, etc.) is more desirable. The total thickness of the separator for battery of the present invention is usually from 10 to 200 μm, and preferably from 20 to 100 μm, though depending on its laminate structure and other factors.

As previously described, the proportion of the total thickness of the porous high molecular weight polypropylene layers is preferably from 20% to 99%, more preferably from 30% to 90%, and most preferably from 50% to 80%, of the entire thickness of the separator. In other words, the greater the thickness of the porous high molecular weight polypropylene layer is, the greater is the mechanical strength of the separator for battery but the more difficultly can be assured SD characteristics. On the contrary, the smaller the proportion of the total thickness of the porous high molecular weight polypropylene layer in that of the separator for battery is, the better are SD characteristics but the lower are the heat resistance and strength of the separator for battery.

The porous laminate film of the present invention exhibits a needle penetration strength of 400 gf or more. The needle penetration strength can be one of indications of the mechanical strength of separator for battery. In other words, it is known that the needle penetration strength of separator for battery is closely related to inner shortcircuiting of battery due to break and penetration of separator for battery during and after battery assembly. The higher the needle penetration strength is, the less can be the occurrence of inner shortcircuiting of battery. If the needle penetration strength of the separator for battery is 400 gf or more, and preferably 500 gf or more, the occurrence of inner shortcircuiting due to break and penetration of separator for battery can be reduced. The needle penetration strength of 400 gf or more can be realized by forming a porous high molecular weight polypropylene layer having a weight average molecular weight of 500,000 or more. This is one of the characteristics of the present invention. In other words, the molecular weight of the high molecular weight polypropylene and the needle penetration strength of the porous laminate film are closely related to each other. Besides the molecular weight, as the factors of the porous laminate film there can be production conditions such as draw ratio, heat treatment temperature and orientation temperature, and factors such as molecular weight distribution of material constituting the porous high molecular polypropylene layer. If the above requirements of the present invention can be satisfied, a needle penetration strength of 400 gf or more can be normally realized.

From the standpoint of the characteristics of the porous laminate film, the separator for battery of the present invention exhibits SD initiation temperature of from 100° to 135° C. and a heat resistant temperature of 155° C. or more. This is because if the heat resistant temperature of the separator for battery is below 155° C., the resulting overshoot of the temperature in the battery breaks the separator for battery, possibly causing inner shortcircuiting.

The electrical resistivity of the separator for battery which has developed its SD function preferably rises rapidly to at least scores of times, and more preferably hundreds of times, that in the vicinity of room temperature. As an indication of the electrical resistivity which has thus been reached there may be employed the value at 135° C. Thus, the separator for battery of the present invention exhibits an electrical resistivity of 100 Ω.cm² or more at 135° C. This is because if the separator for battery exhibits an electrical resistivity of 100 Ω.cm² or more at 135° C., the resulting electrical resistivity which should act to inhibit the electrical reaction is too low, making it more likely that the exothermic reaction of the battery cannot be completely controlled.

The term "electrical resistivity" as used herein means the value including the electrical resistivity of the separator for battery itself as well as the electrical resistivity of electrolyte and interface of electrode. If this value is from 10 to 15 Ω.cm² at 25° C., the electrical resistivity of the separator for battery itself is from about 0.5 to 2 Ω.cm².

An example of the process for the preparation of the separator for battery of the present invention will be described hereinafter.

Firstly, a laminate film is prepared. The preparation of such a laminate film can be accomplished, e.g., by means of a film-forming machine equipped with a feed-block type or multi-layer type T-die or an inflation type film-forming machine. If a film-forming machine equipped with a T-die consisting of three different layers is employed, a high density PE (polyethylene) having a weight average molecular weight of from 150,000 to 600,000 or a blend of such PE and an isotactic PP (polypropylene) (PP:PE=1:9 to 9:1) is supplied into the T-die film-forming machine as a raw material for middle layer. As raw materials for both surface layers on the middle layer an isotactic PP (polypropylene) having a weight average molecular weight of 500,000 or more is supplied into the T-die film-forming machine. Referring to the film-forming conditions, the extrusion temperature may be from 220° to 290° C., the casting roll temperature may be from 20° to 120° C., the draw ratio may be from 10 to 100, the take-off speed may be from 3 to 100 m/min., the total thickness of film may be from 20 to 100 μm, and the proportion of the thickness of the middle layer in the total thickness of the laminate film may be from 1 to 80%.

Subsequently, the laminate film thus formed is preferably subjected to heat treatment (annealing) as necessary. Examples of the heat treatment process include a process which comprises bringing the laminate film into contact with a heating roll, a process which comprises exposing the laminate film to heated gas phase, a process which comprises exposing the laminate film wound on a core to heated gas or liquid phase, and a process comprising these processes in combination. The heat treatment conditions may be appropriately determined by the kind or other factors of the material constituting the laminate film. In general, the heat treatment may be effected at a temperature of from 120° to 170° C. for 10 seconds to 100 hours.

The laminate film thus processed is then stretched so that it is rendered porous. In general, the stretching may be accomplished by a roll process monoaxial stretching or a tenter process biaxial stretching combined with the roll process. In some detail, the laminate film is stretched at a temperature as low as from −20° to 80° C. by 10 to 100% based on the original film length. Subsequently, the laminate film is stretched at a temperature as high as 80° C. to 130° C. in the same direction as the above stretching direction by 60 to 300% based on the length of the unstretched film. Further, if necessary, the laminate film is then preferably shrunk at a temperature of from 80° to 130° C. by 5 to 30% based on the length of the film which has been stretched in the above high temperature range so that the residual stress is relaxed.

By preparing a porous laminate film in this manner, a separator for battery of the present invention as shown in FIG. 1(c) can be obtained. The separator for battery thus obtained has a total thickness of from 10 to 200 μm. The proportion of the thickness of the middle layer 2 in the total thickness of the separator for battery is from 1% to 80%. The separator for battery thus obtained exhibits a Gurley value of from 200 to 1,500 at 25° C., a needle penetration strength of 400 g or more, SD initiation temperature of from 100° to 135° C., a heat resistant temperature of 155° C. or more and an electrical resistivity of 100 Ω.cm³ at 135° C.

The present invention is not limited to the above three-layer separator for battery. For example, if a separator for battery having such a laminate structure as shown in FIGS. 1(a) and (b) is prepared, raw materials may be supplied into the film-forming machine during the formation of a laminate film such that a laminate structure corresponding to the purpose can be obtained.

The present invention will be further described in the following examples, comparative examples and reference examples. The physical properties and other properties evaluated in these examples were measured in the following manner.

(Weight average molecular weight)

The weight average molecular weight of the specimen was measured at 135° C. with a gel-permeation chromatograph (GPC-150C, available from Waters Inc.) using o-dichlorobenzene as a solvent. The column used was Shodex KF-80M (available from Showa Denko K.K.). For data processing, a data processing system available from TRC Inc. was used. The molecular weight was calculated in terms of polystyrene.

(Melting point)

For the measurement of melting point, a differential scanning calorimeter (DSC200, available from Seiko Instrument Inc.) was used. In operation, the specimen was heated at a rate of 20° C./min. in a sealed vessel from room temperature to 220° C. where it was then kept for 30 minutes. The specimen was then cooled to room temperature at a rate of 2° C./min. The specimen was then heated at a rate of 10° C./min. The temperature at which the heat absorption peaks during the heat rising process was regarded as melting point.

(Film thickness)

For the measurement of the film thickness, a dial gauge with a minimum scale of 1/1000 mm available from Ozaki Seisakujo K.K. was used.

(Thickness of middle layer)

The film to be measured was frozen and broken with liquid nitrogen in the direction parallel to the lengthwise direction thereof. The section thus developed was then observed by a scanning electron microscope PE-SEM (S-4000, available from Hitachi Ltd.; accelerating voltage: 3 kV) at a magnification of 2,000 to determine the thickness of the middle layer.

(Gurley value)

The time required until 10 cc of air permeates through the membrane at a unit area of 645 mm² was measured by a Gurley type densometer No. 323-Auto available from Yasuda Seiki Seisakujo K.K. in accordance with JIS P 8117. The value thus determined was then multiplied by 10 to determine Gurley value.

(Needle penetration strength)

Using a handy compression tester KES-G5 available from Katotech Co., Ltd., the specimen was measured for the maximum allowable load under which it can withstand the penetration of a needle having a diameter of 1.0 mm and a tip with a radius of curvature of 0.5 mm through a holder having a diameter of 11.3 mm at a rate of 2 mm/sec.

(SD characteristics)

Figure 2:
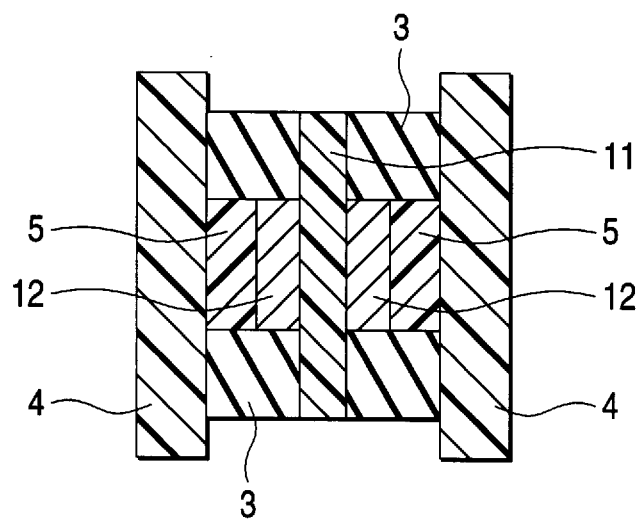
FIG. 2 is a sectional view illustrating the configuration of an electrical resistivity measuring cell for use in the measurement of SD characteristics.

For the measurement of SD characteristics, an electrical resistivity measuring cell as shown in FIG. 2 was used. As shown in FIG. 2, the electrical resistivity measuring cell comprises a separator 11 disposed substantially in the central portion thereof. Platinum electrodes (diameter: 20 mm) 12 are disposed on both sides of the separator 11 (left side and right side of the separator 11 as viewed in the drawing), respectively, in such an arrangement that they are opposed to each other. A polytetrafluoroethylene plate 4 is disposed on the other side of these platinum electrode 12 via a nonwoven polypropylene fabric 5 in such an arrangement that the entire apparatus is clamped thereby (with a clamping force of 8 kgf). Disposed on the top and bottom of the apparatus is a silicone rubber packing 3 in such an arrangement that the apparatus is sealed.

The nonwoven polypropylene fabric 5 is impregnated with an electrolyte obtained by dissolving $LiBF_4$ in a mixture of the same volume of propylene carbonate and dimethoxymethane in a concentration of 1 mol/l. Although not shown, an LCR meter is connected to the platinum electrode 12. Similarly, a thermocouple is in contact with the platinum electrode 12.

The electrical resistivity measuring cell having such a structure was then set in a drying oven which had been adjusted to a temperature of 200° C. so that it was heated at a rate of from 5° to 7° C./min. The electrical resistivity (9) of the separator was measured at various temperatures. The electrical resistivity was then multiplied by the area of the electrode (3.14 cm$^2$) to obtain the electrical resistivity of the separator for battery at the respective temperature ($\Omega.cm^2$). This value includes the electrical resistivity of the separator for battery itself as well as the electrical resistivity of electrolyte and interface of electrode. For the measurement of the electrical resistivity, a Type KC-532 LCR meter available from Kokusan Denki Kogyo K.K. was used to determine AC resistance at 1 KHz. The temperature at which this value begins to rise is SD initiation temperature (°C.). The electrical resistivity at 135° C. is referred to as R135 (°C.). The temperature at which the electrical resistivity which has once been raised shows a drop to 10 $\Omega.cm^2$ or less is heat resistant temperature (°C.). The electrical resistivity at 25° C. is regarded as the electrical resistivity of the separator for battery at normal time.

(Proportion defective winding)

An alternate laminate of electrode materials having a length of 50 cm, a width of 59 mm and a width of about 120 μm comprising an aluminum foil and a copper foil coated with a composite oxide of Li and Co as a positive electrode and carbon, respectively, with two sheets of separators for battery was wound under a tension of 400 gf per 60 mm width of separator for battery. Using a Type TOS8850 automatic dielectric strength tester available from Kikusui Electronics Corp., 100 V was applied across the positive and negative electrodes. After 30 seconds, the electrical resistivity was measured. Those showing an electrical resistivity of 1 MΩ or less was regarded as having defective insulation. Those showing defective insulation were regarded as having defective winding. The number of defectives per the total number of wound specimens (10) represents proportion defective winding. The higher the proportion defective winding is, the higher is the possibility of occurrence of damage such as break during winding of separator for battery.

REFERENCE EXAMPLE

Five kinds of isotactic PP having different weight average molecular weights (all PP's are homopolymers) were prepared as shown in Table 1. These isotactic PP's were each processed at a draw ratio of from 30 to 35 by a T-die type film-forming machine to form a film having a thickness of from 28 to 30 μm. The film thus formed was then allowed to come in contact with the surface of a roll having a surface temperature of from 154° to 155° C. for about 80 seconds while being clamped by two sheets of PET films having a thickness of 50 μm so that it was subjected to heat treatment. Subsequently, these PET films were removed to obtain a single-layer film. The single-layer film thus obtained was then stretched at a temperature as low as 25° C. by 50% based on the length of the unstretched film. The single-layer film was then stretched at a temperature as high as 135° C. by 150% based on the length of the unstretched film (total draw ratio=200% (=factor of 3)). Further, the single-layer film was shrunk at 135° C. by 20% based on the length of the high temperature-stretched film (final draw ratio=2.4) to obtain a porous single-layer film.

The properties of the five kinds of porous single-layer films thus obtained and a commercially available porous PP. film are shown in Table 1. The relationship between the weight average molecular weight and the needle penetration strength of polypropylene is graphically shown in FIG. 3.

TABLE 1

| Properties | Sample No. | | | | | Commercial PP film |
|---|---|---|---|---|---|---|
| | 1 | 2 | 3 | 4 | 5 | |
| Weight average molecular weight (×10$^4$) | 98 | 82 | 66 | 44 | 42 | 47 |
| Thickness (μm) | 26 | 25 | 25 | 26 | 26 | 25 |
| Gurley value | 490 | 850 | 620 | 320 | 550 | 800 |
| Needle penetration strength (gf) | 510 | 490 | 470 | 320 | 180 | 430 |

Figure 3:
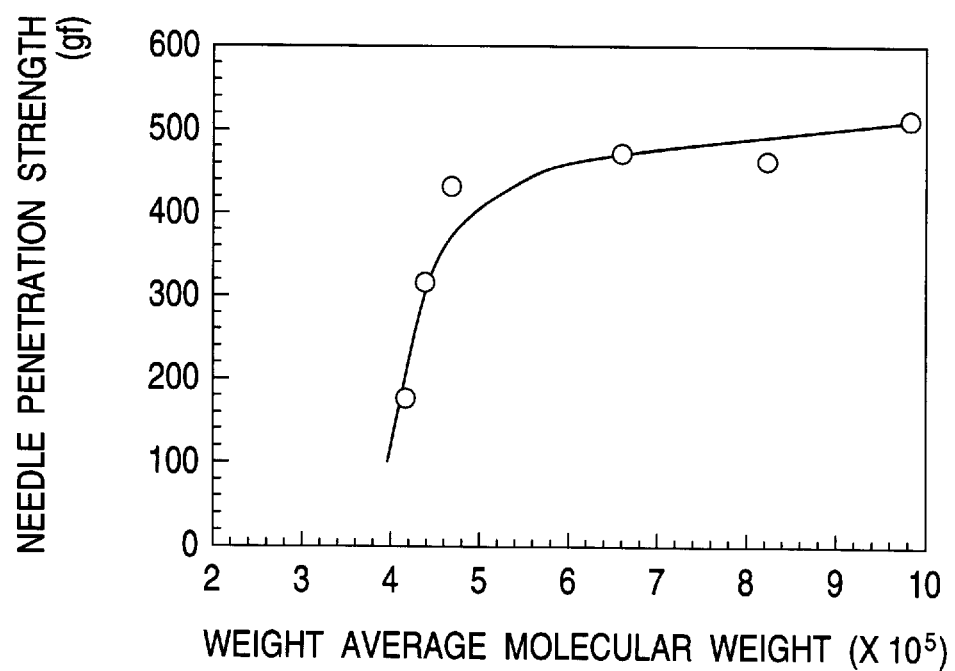
FIG. 3 is a graph illustrating the relationship between the molecular weight of a porous high molecular weight polypropylene layer and the needle penetration strength of a porous film, wherein the reference numeral 1 indicates a porous high molecular weight polypropylene layer having a weight average molecular weight of 500,000 or more, and the reference numeral 2 indicates a porous layer comprising a material having a melting point of from 100° to 140° C.

As can be seen in Table 1 and FIG. 3, the use of a polypropylene having a weight average molecular weight of 500,000 or more can provide a porous film having a strength as high as 400 gf as calculated in terms of needle penetration strength. The commercially available porous PP film exhibited too high a SD initiation temperature.

EXAMPLE 1

As a surface layer-forming material there was used a polypropylene having a weight average molecular weight of 980,000. As a middle layer-forming material there was used a high density polyethylene having a weight average molecular weight of 350,000 and a density of 0.968. These raw materials were then processed at an extrusion temperature of 240° C. and a draw ratio of 30 to form a three-layer film having a thickness of 33 μm. The film thus formed was then subjected to heat treatment in a 125° C. dryer for 48 hours. The film thus treated was stretched at 25° C. by 40% based on the length of the unstretched film, stretched at 120° C. by 220% based on the length of the unstretched film, and then shrunk at the same temperature by 8% based on the length of the high temperature-stretched film to obtain a porous three-layer laminate film (separator for battery) having a total thickness of 26 μm and a middle layer thickness of 6 μm. The porous laminate film had a laminate structure as shown in FIG. 1(c).

EXAMPLE 2

The procedure of Example 1 was followed except that a polypropylene having a weight average molecular weight of 820,000 was used as a surface layer-forming material and a high density polyethylene having a weight average molecular weight of 260,000 and a density of 0.966 was used as a middle layer-forming material. As a result, a porous three-layer laminate film having a total thickness of 25 μm and a middle layer thickness of 6 μm was obtained.

EXAMPLE 3

As a surface layer-forming material there was used a polypropylene having a weight average molecular weight of 980,000. As a middle layer-forming material there was used a mixture of 50% by weight of a high density polyethylene having a weight average molecular weight of 260,000 and a density of 0.966 and 50% by weight of a polypropylene having a weight average molecular weight of 980,000. These raw materials were then processed in the same manner as in Example 1 to form a three-layer film (nonporous) having a thickness of 32 μm. The film thus formed was allowed to come in contact with a heat roll the surface temperature of which had been kept at 153° C. for 80 seconds, wound on an iron core, and then subjected to heat treatment in a 125° C. dryer as it was for 48 hours. The film thus processed was stretched at 25° C. by 60% based on the length of the unstretched film, stretched at 118° C. by 160% based on the length of the unstretched film, and then shrunk at the same temperature by 25% based on the length of the high temperature-stretched film to obtain a porous laminate film having a total thickness of 25 μm and a middle layer thickness of 7 μm.

EXAMPLE 4

The procedure of Example 3 was followed except that the surface temperature of the heat roll was changed to 155° C. and the temperature of the dryer was changed to 130° C. As a result, a porous laminate film having a total thickness of 27 μm and a middle layer thickness of 8 μm was obtained.

EXAMPLE 5

The procedure of Example 3 was followed except that the surface temperature of the heat roll was changed to 151° C. As a result, a porous laminate film having a total thickness of 24 μm and a middle layer thickness of 6 μm was obtained.

COMPARATIVE EXAMPLE 1

As a surface layer-forming material there was used a polypropylene having a weight average molecular weight of 440,000. As a middle layer-forming material there was used a high density polyethylene having a weight average molecular weight of 350,000 and a density of 0.968. These raw materials were then processed in the same manner as in Example 1 to form a three-layer film having a thickness of 33 μm. The film thus formed was wound on an iron core, and then subjected to heat treatment in a 125° C. dryer for 48 hours. The film thus processed was then stretched in the same manner as in Example 1 to obtain a porous laminate film having a total thickness of 25 μm and a middle layer thickness of 7 μm.

COMPARATIVE EXAMPLE 2

A high density polyethylene having a weight average molecular weight of 350,000 and a density of 0.968 was processed at an extrusion temperature of 120° C. and a draw ratio of 30 to form a single-layer polyethylene film having a thickness of 40 μm. The film thus formed was wound on an iron core, and then subjected to heat treatment at 125° C. in a dryer for 50 hours. The film thus formed was stretched at 25° C. by 100% based on the length of the unstretched film, stretched at 115° C. by 260% based on the length of the unstretched film, and then shrunk at the same temperature by 25% based on the length of the high temperature-stretched film to obtain a porous polyethylene film having a total thickness of 29 μm.

COMPARATIVE EXAMPLE 3

Sample No. 1 film of Reference Example was used.

The separators for battery of Examples 1 to 5 and Comparative Examples 1 to 3 thus obtained were then examined for Gurley value, needle penetration strength, SD initiation temperature, electrical resistivity at 135° C. (R135), heat resistant temperature, proportion defective winding and electrical resistivity at normal time (temperature: 25° C.). The results obtained are shown in Table 2.

TABLE 2

| Properties | Example | | | | | Comparative Example | | |
|---|---|---|---|---|---|---|---|---|
|  | 1 | 2 | 3 | 4 | 5 | 1 | 2 | 3 |
| Gurley value | 830 | 650 | 770 | 380 | 1300 | 810 | 400 | 490 |
| Needle penetration strength (gf) | 530 | 500 | 490 | 420 | 510 | 310 | 240 | 510 |
| SD initiation temperature (°C.) | 130 | 129 | 128 | 127 | 128 | 127 | 128 | 155 |
| R135 ($\Omega \cdot cm^2$) | $2 \times 10^5$ | $3 \times 10^5$ | $3 \times 10^4$ | $2 \times 10^4$ | $4 \times 10^5$ | $6 \times 10^4$ | $5 \times 10^4$ | 10 |
| Heat resistant temperature (°C.) | >160 | >160 | >160 | >160 | >160 | >160 | 140 | >160 |
| Proportion defective winding (/10) | 0/10 | 0/10 | 0/10 | 0/10 | 0/10 | 2/10 | 4/10 | 0/10 |
| Electrical resistivity at normal temperature ($\Omega \cdot cm^2$) | 14 | 13 | 12 | 10 | 15 | 12 | 11 | 12 |

As can be seen in Table 2, the separators for battery of the present invention exhibited a sufficiently low electrical resistivity at normal time. The separators for battery of the present invention exhibited good SD characteristics, i.e., sufficiently low SD initiation temperature, sufficiently high electrical resistivity at 135° C. and sufficiently high heat resistant temperature. All the separators for battery of the present invention exhibited a needle penetration strength of far exceeding 400 gf. None of these separators for battery produced defective winding.

On the other hand, the separators for battery of Comparative Examples 1 and 2 exhibited a needle penetration strength as low as 310 gf and 240 gf, respectively, and a proportion defective winding as high as 2/10 and 4/10, respectively. The separator for battery of Comparative Example 3 produced no defective winding but exhibited SD initiation temperature as high as 155° C.

As described above, the separator for battery of the present invention exhibits a low electrical resistivity at normal time, excellent SD characteristics and a high mechanical strength. Accordingly, if the separator for battery of the present invention is incorporated, e.g., in a lithium battery, its low electrical resistivity and good SD characteristics allow the resulting lithium battery to sufficiently fulfill its high function and assure its safety. Because of its high mechanical strength, the separator for battery can be prevented from being broken or otherwise damaged at the step of winding the separator for battery during the preparation of the lithium battery, making it possible to reduce percent defective attributed to separator for battery.

While the invention has been described in detail and with reference to specific embodiments thereof, it will be apparent to one skilled in the art that various changes and modifications can be made therein without departing from the spirit and scope thereof.

What is claimed is:

1. A separator for battery, comprising a porous laminate film, wherein said porous laminate film comprises a porous high molecular weight polypropylene layer having a weight average molecular weight of 660,000 or more and a porous layer comprising a material having a melting point of from 100° to 140° C., and has a Gurley value at 25° C. of from 200 to 1,500.

2. The separator for battery as claimed in claim 1, wherein said porous laminate film has a needle penetration strength of 400 g or more, a shut-down initiation temperature of from 100° to 135° C., a heat-resistant temperature of 155° C. or more and an electrical resistivity at 135° C. of 100 $\Omega.cm^2$ or more.

3. The separator for battery as claimed in claim 1, wherein said porous laminate film has a laminate structure comprising three or more layers, and the surface layer of said porous laminate film comprises a porous high molecular weight polypropylene having a weight average molecular weight of 660,000 or more.

4. The separator for battery as claimed in claim 2, wherein said porous laminate film has a laminate structure comprising three or more layers, and the surface layer of said porous laminate film comprises a porous high molecular weight polypropylene having a weight average molecular weight of 660,000 or more.

5. The separator for battery as claimed in claim 1, wherein said high molecular weight polypropylene has the weight average molecular weight of 800,000 or more.

6. The separator for battery as claimed in claim 2, wherein said high molecular weight polypropylene has the weight average molecular weight of 800,000 or more.

7. The separator for battery as claimed in claim 3, wherein said high molecular weight polypropylene has the weight average molecular weight of 800,000 or more.

8. The separator for battery as claimed in claim 1, wherein the proportion of the total thickness of porous high molecular weight polypropylene layers having a weight average molecular weight of 660,000 or more is from 20% to 99% of the entire thickness of said separator for battery.

9. The separator for battery as claimed in claim 2, wherein the proportion of the total thickness of porous high molecular weight polypropylene layers having a weight average molecular weight of 660,000 or more is from 20% to 99% of the entire thickness of said separator for battery.

10. The separator for battery as claimed in claim 3, wherein the proportion of the total thickness of porous high molecular weight polypropylene layers having a weight average molecular weight of 660,000 or more is from 20% to 99% of the entire thickness of said separator for battery.

11. The separator for battery as claimed in claim 4, wherein the proportion of the total thickness of porous high molecular weight polypropylene layers having a weight average molecular weight of 660,000 or more is from 20% to 99% of the entire thickness of said separator for battery.

12. The separator for battery as claimed in claim 1, wherein said porous layer comprising a material having a melting point of from 100° C. to 140° C. comprises as a main component a resin composition comprising 0% to 60% by weight of a polypropylene and 40% to 100% by weight of a polyethylene, the sum of said polypropylene and said polyethylene being 100% by weight.

13. The separator for battery as claimed in claim 2, wherein said porous layer comprising a material having a melting point of from 100° C. to 140° C. comprises as a main component a resin composition comprising 0% to 60% by weight of a polypropylene and 40% to 100% by weight of a polyethylene, the sum of said polypropylene and said polyethylene being 100% by weight.

14. The separator for battery as claimed in claim 3, wherein said porous layer comprising a material having a melting point of from 100° C. to 140° C. comprises as a main component a resin composition comprising 0% to 60% by weight of a polypropylene and 40% to 100% by weight of a polyethylene, the sum of said polypropylene and said polyethylene being 100% by weight.

15. The separator for battery as claimed in claim 4, wherein said porous layer comprising a material having a melting point of from 100° C. to 140° C. comprises as a main component a resin composition comprising 0% to 60% by weight of a polypropylene and 40% to 100% by weight of a polyethylene, the sum of said polypropylene and said polyethylene being 100% by weight.

16. The separator for battery as claimed in claim 5, wherein said porous layer comprising a material having a melting point of from 100° C. to 140° C. comprises as a main component a resin composition comprising 0% to 60% by weight of a polypropylene and 40% to 100% by weight of a polyethylene, the sum of said polypropylene and said polyethylene being 100% by weight.

* * * * *